United States Patent [19]

Beggs et al.

[11] Patent Number: 5,316,752
[45] Date of Patent: May 31, 1994

[54] PROCESS FOR PREPARING MIXED OXIDES

[75] Inventors: Ronald L. Beggs, Leander; Duane J. Lewis; David A. Barclay, both of Austin, all of Tex.

[73] Assignee: Vista Chemical Company, Houston, Tex.

[21] Appl. No.: 692,002

[22] Filed: Apr. 26, 1991

[51] Int. Cl.$^5$ .............................. C01B 13/14
[52] U.S. Cl. .................... 423/593; 423/592; 423/617; 423/624; 423/625; 501/12; 501/128; 501/153
[58] Field of Search ............. 501/12, 128, 119, 153, 501/154; 423/329, 592, 617, 624, 625

[56] References Cited

U.S. PATENT DOCUMENTS

| 4,676,928 | 6/1987 | Leach et al. | 423/630 X |
| 5,030,592 | 7/1991 | Komarneni et al. | 501 12 X/ |
| 5,045,514 | 9/1991 | Ismail et al. | 501/12 X |

FOREIGN PATENT DOCUMENTS 3618576 12/1986 Fed. Rep. of Germany.
144111 6/1988 Japan.

OTHER PUBLICATIONS

Read, "Introduction to the Principles of Ceriamic Processing", John Wiley & Sons, 1988, New York, pp. 272–273.

Hoffman et al., "Dishasic Xerogels, A New Class of Materials:..." J. Am. Cer. Soc., vol. 67[7] pp. 468–471, (1984).

Mizuno et al., "Preparation of Highly Pure Fine Mullite Powder" J. Am. Ceram. Soc., 72[3] pp. 377–382 (1989).

Komarneni et al. "Application of Compositionally Diphasic Xerogells..." J. Am. Ceram. Soc., 69[7] pp. C-155-C-156 (1986).

Primary Examiner—Mark L. Bell
Assistant Examiner—Michael Marcheschi
Attorney, Agent, or Firm—Browning, Bushman, Anderson & Brookhart

[57] ABSTRACT

A process for producing mixed oxides containing an alumina species in which a mixture of a hydrated alumina having a specified surface area (average crystal size), a fluid medium and a compound having the formula $M_xA_y$ wherein M is selected from the group consisting of metals, silicon, boron, arsenic and tellurium, A is selected from the group consisting of oxygen and anions, x is from 1 to 4 and y has a value satisfying said formula depending on the valence of M, is formed into a uniform sol, the sol is recovered from the liquid medium and dehydrated, and the dehydrated product is de-agglomerated to produce a mixed oxide having an average particle size of about 1 micron or less.

9 Claims, 1 Drawing Sheet

PROCESS FOR PREPARING MIXED OXIDES

BACKGROUND OF THE INVENTION

1. Field of the Invention

The present invention relates to a process for preparing particulate, mixed oxides using an alumina hydrate as one of the starting materials. More particularly, the present invention relates to an improved process for producing mullite.

2. Description of the Background

Mixed metal oxides are finding increasing use in the manufacture of precision ceramic parts for high tech ceramics, solid state electronics and other high technology fields. The starting materials for such end products are generally sub-micron, de-agglomerated mixed metal oxide powders, e.g. mullite. Mullite is an aluminum silicate having the formula $3Al_2O_3 \cdot 2SiO_2(Al_2O_3/SiO_2=1.5)$ that forms a solid solution with aluminum oxide when the molar ratio of $Al_2O_3/SiO_2$ is in a range of 1.50 to 2.87 (Ceramic International, 9 (4), 107–113 (1983) by J. A. Pash). Mullite is recognized as a useful material in ceramic applications where high temperature stability is required. Mullite is also resistant to thermal shock making it useful in critical applications. To obtain the desired properties, e.g. low sintering temperature, it has been found necessary to utilize synthetic mullite where the homogeneity and microstructure of the mullite can be controlled. Specifically, it is desirable to produce mullite having sub-micron particle size.

Synthetic mullites are currently produced by a variety of methods including coprecipitation, sol-gel, vapor phase reaction, and thermal diffusion. Of the above mentioned, the sol-gel technique is currently the most widely practiced method. In the sol-gel method, a colloidally dispersed boehmite sol is combined with a dispersed colloidal silica sol to obtain an intimate mixture. The mixture is then dried, milled to reduce particle size, fired to convert the amorphous mixture to mullite, and then milled again to reduce the particle size of the finished powder. Generally speaking, the boehmite sol employed in the prior art methods consists of small size boehmite crystals referred to as "pseudoboehmite".

Techniques for producing mullite by sol-gel techniques are disclosed, for example, in German Patent DE 3,618,576, and Japanese Kokai No. SHO 63(1988-144111). Additionally, in U.S. Pat. No. 4,679,928, there is disclosed a method of forming a water-dispersible boehmite colloidal sol.

SUMMARY OF THE INVENTION

It is therefore an object of the present invention to provide an improved process for producing a mixed oxide containing an alumina species.

Another object of the present invention is to provide an improved process for preparing a mixed oxide containing an alumina species employing a sol-gel technique.

Yet another object of the present invention is to provide an improved process for preparing mullite.

The above and other objects of the present invention will become apparent from the drawings, the description given herein and the appended claims.

The process of the present invention permits the preparation of a mixed oxide powder, e.g. mullite, containing an alumina species in which the average particle size of the powder is less than about 1 micron. In the process, a mixture is formed of a fluid medium, a hydrated alumina having a specified surface area (specified average crystal size) and a compound having the formula $M_xA_y$ wherein M is selected from the group consisting of metals, boron, silicon, arsenic and tellurium, A is selected from the group consisting of oxygen and anions, x is from 1 to 4 and y is a value satisfying the formula depending on the valence of x. The mixture is treated in a suitable fashion to obtain a uniform sol of the hydrated alumina, the fluid medium and the compound. The fluid medium is removed to provide a product which is dehydrated, e.g. calcined, and then de-agglomerated to produce a powder of the mixed metal oxide.

DESCRIPTION OF THE PREFERRED EMBODIMENTS

Figure 1:
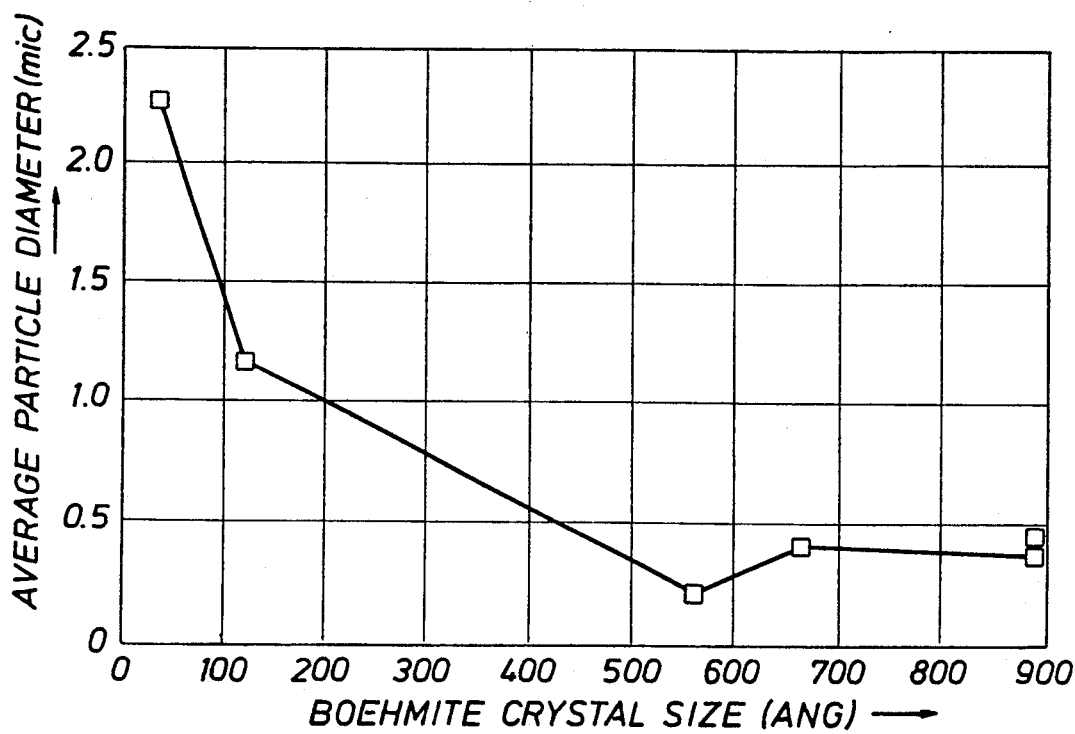
FIG. 1 is a graph showing the relationship between the average crystal size of the hydrated alumina used as a starting material and the average particle size of a mullite produced according to the process of the present invention.

The process of the present invention is based on the finding that by using a hydrated alumina wherein the surface area of the alumina falls into a desired range, it is possible to produce mixed oxides containing an alumina species ($Al_2O_3$), e.g. mullite, which have desired small particle size, i.e. less than 1 micron, are easy to de-agglomerate or grind and can be formed into products having a fired density 90% or greater of theoretical density. The process provides an improvement in current sol-gel technology for making mixed oxides such as mullite.

The process of the present invention employs a mixture of a hydrated alumina, a fluid medium, e.g. an aqueous medium, and at least one additional compound or material. The hydrated alumina which can be used in the process of the present invention can include, without limitation, pseudoboehmite, boehmite, bayerite, diaspore, etc., whether obtained from natural or synthetic sources. A preferred hydrated alumina comprises a pseudoboehmite or a boehmite alumina. The preferred boehmite may be either of the water-dispersible type such as disclosed in U.S. Pat. No. 4,676,928, incorporated herein by reference, or of the acid-dispersible type such as disclosed in U.S. Pat. No. 4,746,503, incorporated herein by reference. As is well known, boehmite is commonly obtained synthetically by the hydrolysis of aluminum alkoxides in the well known fashion. Typical methods for preparing such aluminum alkoxides are shown, for example, in U.S. Pat. No. 4,242,271, incorporated herein by reference for all purposes. The aluminum alkoxide can be hydrolyzed, in the well known manner, such as by the process taught in U.S. Pat. No. 4,202,870, incorporated herein by reference for all purposes. Especially preferred are boehmite aluminas obtained from the hydrolysis of aluminum alkoxides derived from Ziegler Chemistry in the well known manner. However, it will be recognized that the preferred boehmite alumina can be derived from other sources.

The hydrated alumina employed in the process of the present invention will have a surface area of from about 4 to about 150 $M^2/g$ which, in the case of boehmite, corresponds to an average crystal size of from about 5000 to about 80 Angstroms (020 plane as measured by X-ray diffraction), respectively. In particular, and when producing mullite by the process of the present invention, it has been found particularly desirable to employ a hydrated alumina (boehmite) having a surface area of from about 150 to 21 $M^2/g$ (average crystal size of from about 80 to about 900 Angstroms, respectively). Slip cast articles of mullite prepared according to the process of the present invention and in which the hydrated alumina used is a boehmite having an average crystal size of from about 80 to 900 Angstroms achieve greater than 90 percent of theoretical density of firing.

As noted above, the process of the present invention is directed to forming mixed oxides containing an alumina species. Accordingly, the amount of the hydrated alumina employed in the process will depend upon the desired end product, i.e. the mixed oxide. For example, in the case of producing mullite according to the process of the present invention, it is desired that the molar ratio of $Al_2O_3/SiO_2$ be 1.5 (71.8% $Al_2O_3$, 39.2% $SiO_2$) or more, it being recognized that a solid solution with aluminum oxide is formed when the molar ratio of $Al_2O_3/SiO_2$ is in the range of from about 1.50 to 2.87. Thus, the amount of hydrated alumina initially used would be adjusted accordingly. In the case of other mixed oxides, e.g. spinel (magnesia/aluminum oxide), aluminum titanates, cordierite, etc. the amount of hydrated alumina employed in the process will vary to achieve the desired composition. It will thus be appreciated that the mixed oxide can be tailored according to the process of the present invention by varying the amount of the hydrated alumina versus the other compound(s) employed in making the mixed oxide.

In addition to the hydrated alumina, the process of the present invention employs a compound (MA Compound(s)) having the formula $M_xA_y$ wherein M is a metal, as that term is commonly understood, silicon, boron, arsenic or tellurium, A is oxygen or an anion, generally an inorganic anion, such as hydroxide, nitrate, sulfate, etc., x has a value of from 1 to 4 and y has a value which satisfies the formula depending on the valence of M. Non-limiting examples of MA Compounds falling within the above general formula include silicon oxide, silicon dioxide, titanium dioxide, zirconium oxide, boron phosphate, magnesium nitrate, etc. Thus, the MA Compound can be a generally water-insoluble material, i.e. silicon dioxide, a water-soluble salt, i.e. magnesium nitrate, or a mixture of such.

In cases where mullite is prepared in accordance with the process of the present invention, and when the preferred boehmite is employed as a hydrated alumina, it is preferable to use a silicon dioxide having a high reactivity, e.g. a colloidial silicon dioxide or at least a dispersion of finely divided silicon dioxide particles. Preferably the silicon dioxide is an amorphous silicon dioxide, ideally a colloidial silicon dioxide consisting of porous silicon dioxide particles with a large surface area. The finely divided silicon dioxide particles can include white carbon black obtained by a wet method as well as silicon dioxide obtained from the vapor by a dry method.

As in the case of the hydrated alumina, it will be understood that the amount of the MA Compound which is used in the process of the present invention will vary depending upon the desired end product, i.e. the mixed oxide. For example, it may be desirable to form a mixed oxide which is substantially all alumina but which has a minor amount, e.g. less than 1%, of one or more other oxides of one or more of the elements mentioned above, the other oxide(s) serving to tailor the crystal structure of the resulting alumina for some particular purpose.

The fluid medium employed in the process of the present invention can be aqueous or non-aqueous, it being understood that in most cases it will be an aqueous medium. It is also contemplated that, in forming the sol, the process of the present invention can be carried out under supercritical conditions. Although generally speaking, in the process of the present invention, the fluid medium, e.g. aqueous medium, will have a pH of below about 7, e.g. from about 2 to about 5, under certain circumstances it is possible that the pH may be above 7. In the particular case of preparing mullite according to the process of the present invention, the aqueous medium will generally have a pH ranging from about 2 to about 4. Acids such as nitric acid, hydrochloric acid, acetic acid, etc. can be used to adjust the mixture of the hydrated alumina, the MA Compound and the fluid medium to the desired pH. Other dispersing agents can also be employed.

In carrying out the process of the present invention, a mixture of the alumina, the MA compound and the fluid medium is formed. The mixture is then treated in a suitable fashion to obtain a uniform sol. The term "sol", as used herein, is intended to include a gel, a colloidal dispersion, or the like in which the components are generally homogeneously dispersed. The uniform sol can be formed by agitating, i.e. in a stirred vessel, sonically, or in numerous other methods known by those skilled in the art, to achieve a uniform, homogenous mixture of the type contemplated herein.

In obtaining the sols, conditions such as temperature and pressure can vary widely. For example, in the preparation of mullite according to the process of the present invention, the sol can be formed at room temperature or at higher temperatures if desired. It will be appreciated that temperature and pressure conditions will be selected based upon the nature of the MA Compound, the particular hydrated alumina, the desired end product, the kind of fluid medium used and other such parameters.

The fluid medium can be removed from the sol to obtain a substantially solid product by numerous methods such as filtering, centrifuging, etc. Alternatively, the fluid medium can be removed by drying the sol such as spray drying, oven drying, etc.

Once the fluid medium, e.g. aqueous medium, has been removed from the sol, the solid product is dehydrated, e.g. calcined or fired. In dehydrating the product, the temperature employed will depend upon the end product (mixed oxide) sought. Thus, the calcining temperature can range from a temperature of from about 500° to about 1500° C. or higher. In the preparation of mullite according to the process of the present invention, it has been found that a looser agglomeration can be obtained if the dehydration or calcining is conducted at a temperature below 1200° C., preferably from about 900° to about 1200° C. Indeed, it is a feature of the present invention that the mullite can be calcined at temperatures less than 1200° C. and thereby achieve a looser agglomerate which can be more easily ground to the desired, sub-micron particle size. Calcining time parameters such as temperature, etc. can vary widely depending upon the type of mixed oxide being produced. In general calcining time ranging from about 1 minute to about 4 hours can be used. Calcining can be conducted in conventional calcining equipment well known to those skilled in the art.

The dehydrating or calcining of the product produces clusters of weakly agglomerated mixed oxide particles. To convert the agglomerates into the desired powder having an average particle size of about 1 micron or less, it is only necessary to subject the agglomerate to a relatively mild mechanical grinding technique such as milling under conditions which do not result in a wearing away of the components of the grinding apparatus to the extent that any significant amount of impurities from such components are introduced into the mixed oxide powder. For example, intensive mechanical grinding, e.g. ball milling, is unnecessary to reduce the clusters of the mixed oxide to the suitable sub-micron particle size because the agglomerations produced are relatively loosely bound and the particle size of the mixed oxides making up the agglomerations are such that a relatively mild grinding technique such as jet milling (air impact) can be employed. In general, it can be stated that any de-agglomeration process which relies primarily on impingement of the agglomerate and/or particles thereof with one another to obtain the desired sub-micron size can be considered mild grinding, as that term is used herein, as distinguished from grinding which relies primarily on the agglomerates and/or particles thereof being reduced in size by virtue of being literally crushed between components of the grinding equipment.

To more fully illustrate the present invention, the following non-limiting examples are presented:

EXAMPLE 1

A boehmite alumina sold under the name CATAPAL ® by Vista Chemical Company was dispersed in deionized water by the addition of nitric acid and stirring. The average crystal size of the boehmite used was determined by X-ray diffraction to be approximately 35 Angstroms (020 reflection) (surface area ~ 260 $M^2/g$ measured by BET nitrogen adsorption). The pH of the boehmite sol was maintained in the range of 3 to 4. To this was added a quantity of colloidally dispersed silica sold as LUDOX AS-40 ® by E.I. DuPont de Nemours & Company which had also been adjusted to a pH of 3 to 4 by the addition of nitric acid. The quantities of the boehmite and silica sols employed was such as to obtain the desired mullite composition of approximately 72% $Al_2O_3$ and 28% $SiO_2$, by weight. The mixture was thoroughly agitated to obtain a uniform sol which was then dried in an oven. The dried material was ground in a blender to produce a coarse powder which was then dehydrated by heating (firing) in a furnace at 1000° C. for 1 hour. The resulting coarse powder was then milled in an Alpine Jet mill to produce the final product. The particle size of the resulting mullite, as determined using a Sedigraph 5000 ET, was 2.26 microns.

EXAMPLE 2

The procedure of Example 1 was followed with the exception that the average crystal size of the boehmite employed was determined by X-ray diffraction to be approximately 560 Angstroms (020 reflection) (surface area ~ 34 $M^2/g$). The resulting average particle size of the final product was determined by a Sedigraph 5000 ET to be 0.19 microns.

EXAMPLE 3

CATAPAL ® boehmite alumina sol (crystal size 890 Angstroms on the 020 reflection) (surface area ~ 33 $M^2/g$) containing approximately 30% $Al_2O_3$ was placed in a 300 gallon agitated vessel. The pH of the boehmite sol was adjusted to and maintained in a range of 3 to 4 by the addition of nitric acid. To this was added an appropriate amount of LUDOX AS-40 ® colloidal silica, the pH of which was adjusted to the range of 3 to 4 via the addition of nitric acid. The mixture was agitated to obtain a uniform sol which became viscous and required the addition of more water to maintain fluidity. Mixing was continued to ensure a uniform alumina/silica sol. The alumina/silica sol was spray dried in a commercial spray dryer to obtain a dried material. A portion of the spray dried powder was dehydrated (calcined) at 1000° C. for 1 hour and then milled as described above in Example 1. The average particle size of the resulting mixed oxide (mullite) powder was determined to be 0.42 microns.

EXAMPLE 4

The procedure of Example 1 was followed with the exception that the boehmite employed had an average crystal size of 120 Angstroms (020 reflection) (surface area ~ 110 $M^2/g$). The average particle size of the milled mullite was found to be 1.18 microns.

EXAMPLE 5

The procedure of Example 1 was followed with the exception that the boehmite used had an average crystal size of 664 Angstroms (020 reflection) (surface area ~ 39 $M^2/g$). The average particle size of the milled mullite was found to be 0.38 microns.

EXAMPLE 6

A portion of the spray dried powder obtained by the procedure of Example 3 was redispersed in water to form a viscous sol. The sol was then placed in an oven and allowed to dry overnight. The resulting dried material was coarse ground in a blender, fired at 1000° C. for 1 hour and milled as described above in Example 1. The resulting average particle size of the mullite was found to be 0.34 microns.

EXAMPLE 7

Figure 2:
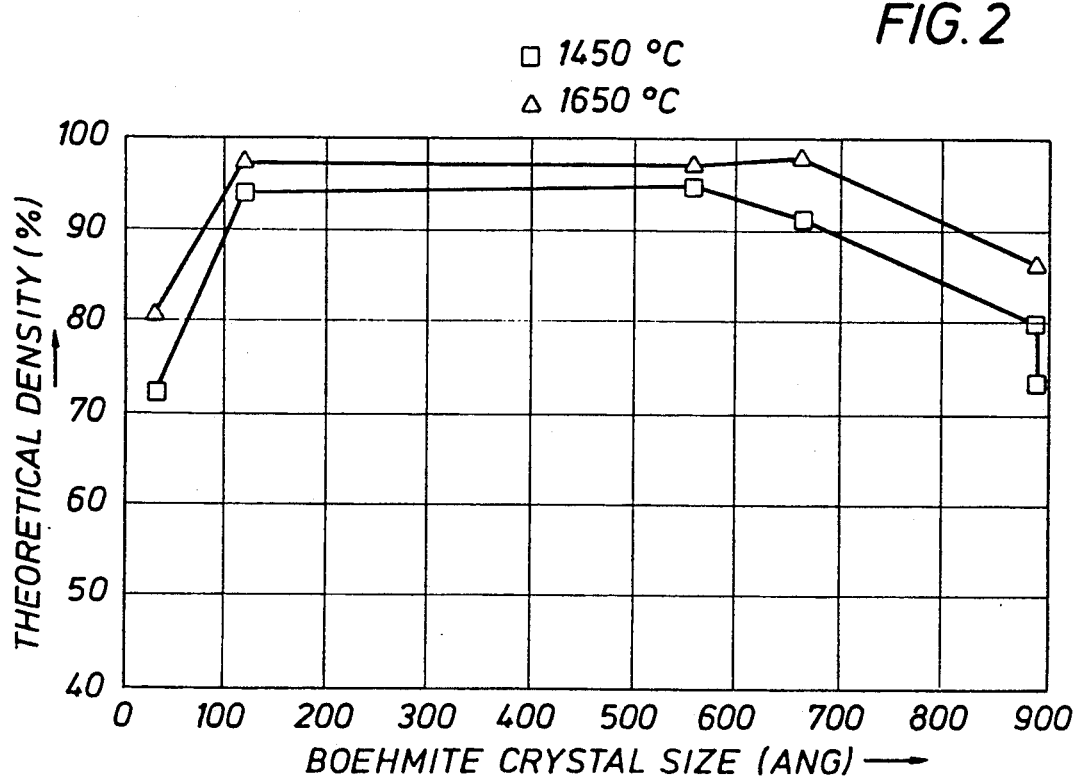
FIG. 2 is a graph showing the relationship between percent theoretical density of a cermic body prepared from mullite produced according to the process of the present invention versus the average crystal size of a hydrated alumina used as a starting product.

The milled powders from each of Examples 1-6 were tested for sinterability by preparing specimens via slip casting. The technique used was to prepare a slip by placing about 50% by weight of the milled mullite powder in deionized water, adding DARVAN C ® (anionic surfactant marketed by R. T. Vanderbilt Co. Inc.) as a dispersing aid and sonically agitating the suspension for 1 minute. The resulting slip was then cast on a plaster block. After air drying, the sample was oven dried 100° C. overnight. Sets of samples were then fired at 1450° C. for 1 hour and at 1650° for 1 hour. The Table below shows the results of Examples 1-7. The data is also displayed in FIG. 1 which shows the relationship between average particle size of the mullite powder as a function of the average crystal size (surface area) of the boehmite used as a starting material. FIG. 2 shows the fired densities of the slips made from the experimental powders as a function of the average crystal size (surface area) of the boehmite used as a starting material.

| EXAMPLE NO. | BOEHMITE 020 CRYSTAL SIZE (Angstroms) | FIRING TEMP. (°C.) | AVERAGE PARTICLE SIZE (Microns) | 1650° C. FIRED DENSITY (%) | 1450° C. FIRED DENSITY (%) |
|---|---|---|---|---|---|
| 1 | 35 | 1000 | 2.26 | 80.5 | 71.9 |
| 2 | 560 | 1000 | 0.19 | 97.1 | 94.6 |
| 3 | 890 | 1000 | 0.42 | 85.2 | 72.8 |
| 4 | 120 | 1000 | 1.18 | 97.4 | 94.0 |
| 5 | 664 | 1000 | 0.38 | 97.8 | 91.2 |
| 6 | 890 | 1000 | 0.34 | 86.2 | 79.6 |

The data in the Table and the Figures clearly show that, for given preparation conditions (e.g. firing temperature at 1000° C., de-agglomerating via jet milling), the mullite powders which were prepared using larger average crystal size, i.e. lower surface area, boehmite have smaller average particle size. With particular reference to FIG. 1, it can be seen that if the average crystal size of the boehmite is about 80 Angstroms or greater, particularly from about 80 to about 1500 Angstroms (020 reflection), the average particle size of the mullite is about 1 micron or less.

With particular reference to FIG. 2, and as applied to mullite produced according to the process of the present invention, it can be seen that for powders prepared by firing at temperatures of 1000° C., the optimum average crystal size of the staring boehmite should be from about 80 to about 900 Angstroms to obtain maximum fired density.

A comparison of the results from Examples 3 and 6 demonstrates that there is no appreciable difference in the mixed oxide product whether made by flash drying (Example 3) or slow drying (Example 6).

EXAMPLE 8

An alumina slurry containing about 10% $Al_2O_3$, and comprised of boehmite crystals having an average crystal size of about 470 Angstroms and a surface area of about 33 $M^2/g$ was placed in an agitated vessel. Magnesium nitrate was dissolved in water and added to the agitated alumina slurry in sufficient quantity to produce a composition containing the equivalent of about 340 ppm MgO on a 100% $Al_2O_3$ basis. Upon addition of the magnesium nitrate solution, the slurry viscosity increased and a small amount of nitric acid was added to reduce viscosity of the mixture. The pH of the mixture was approximately 4 to 5. The mixture was then spray dried to form a powder. The spray dried powder was calcined at 1250° C. for one hour and then milled in a jet mill to produce a product having an average particle size of less than about one micron.

It can thus be seen that using the process of the present invention, it is possible to produced mixed oxides of small, i.e. sub-micron, particle size by using as a starting material, a hydrated alumina which has a particle size which has an average crystal size in the range of from about 80 to about 1500 Angstroms. With particular reference to the production of mullite by the process of the present invention, it can be seen that if the average crystal size of the boehmite used as a starting material is from about 80 to about 900 Angstroms, it is possible to obtain cast parts having fired densities which exceed 90% of the theoretical density.

The foregoing disclosure and description of the invention is illustrative and explanatory thereof, and various changes in the method steps may be made within the scope of the appended claims without departing from the spirit of the invention.

What is claimed is:

1. A process for preparing a mixed oxide containing an alumina species comprising:
    forming an intimate mixture of a fluid medium, a boehmite alumina having a specific surface area of from about 4 to about 150 $m^2/g$ and a compound having the formula $M_xA_y$ wherein M is selected from the group consisting of metals, silicon, boron, arsenic and tellurium, A is selected from the group consisting of oxygen and anions, x is from 1 to 4 and y has a value satisfying said formula depending on the valence of M;
    treating said mixture to form a uniform sol;
    removing said fluid medium and recovering a product containing said hydrated alumina and said compound dehydrating said product at a temperature of from about 900 to about 1200° C.; and de-agglomerating said product using a relatively mild grinding technique to form a powdered mixed oxide.

2. The process of claim 1 wherein said compound is introduced as a colloidal dispersion.

3. The process of claim 1 wherein said fluid medium comprises an aqueous medium and said compound is introduced as an aqueous soluble metal salt.

4. The process of claim 1 wherein said fluid medium comprises an aqueous medium.

5. The process of claim 1 wherein said compound comprises silicon dioxide.

6. The process of claim 5 wherein said silicon dioxide is amorphous.

7. The process of claim 5 wherein the molar ratio of $Al_2O_3$ to $SiO_2$ is 1.5.

8. The process of claim 5 wherein the molar ratio of $Al_2O_3$ to $SiO_2$ is 1.5 to 2.87.

9. The process of claim 5 wherein the specific surface area of said hydrated alumina is from about 21 to about 150 $m^2/g$.

* * * * *

UNITED STATES PATENT AND TRADEMARK OFFICE
CERTIFICATE OF CORRECTION

PATENT NO. : 5,316,752
DATED : May 31, 1994
INVENTOR(S) : Ronald L. Beggs, Duane J. Lewis, and David A. Barclay It is certified that error appears in the above-indentified patent and that said Letters Patent is hereby corrected as shown below:

In Column 8, Line 37, after "pound" insert --;--.

Signed and Sealed this

Thirteenth Day of September, 1994

Attest:

BRUCE LEHMAN

*Attesting Officer*     *Commissioner of Patents and Trademarks*